United States Patent [19]
Lin et al.

[11] Patent Number: 5,472,299
[45] Date of Patent: Dec. 5, 1995

[54] MAIN SHAFT LOCATING MECHANISM FOR CHANGE OF TOOL

[75] Inventors: Chih-Chieh Lin, San Chung; Chun-Hung Huang, Hsinchu; Dong-Jou Shien, Hsinchu City, all of Taiwan

[73] Assignee: Industrial Technology Research Institute, Hsinchu, Taiwan

[21] Appl. No.: 240,141

[22] Filed: May 10, 1994

[51] Int. Cl.⁶ ........................................................ B23C 5/26
[52] U.S. Cl. ......................................................... 409/233
[58] Field of Search .................................... 409/137, 214, 409/218, 231–233; 408/23 B, 239 A; 82/158, 160

Primary Examiner—Mark Rosenbaum
Assistant Examiner—Kenneth J. Hansen
Attorney, Agent, or Firm—Bacon & Thomas

[57] ABSTRACT

A main shaft locating mechanism for change of tool, comprising a locating seat disposed with an eccentric, and a splined shaft disposed with a disk having an eccentric locating pin corresponding to the eccentric hole of the locating seat and adapted to axially fit thereinto. The disk and eccentric locating pin are formed with several orifices from which high pressure gas is injected, forming a gas pad between the eccentric locating pin and the locating seat to greatly reduce friction therebetween before the eccentric locating pin is fitted with the locating seat, whereby the main shaft stops rotating before the the tool is loosened. After the main shaft is stopped and located and the tool is loosened, the direction of the high pressure gas is changed to blow into the mandrel so as to clear up cutting chips accumulated therein for facilitating next tool-changing operation.

5 Claims, 4 Drawing Sheets

MAIN SHAFT LOCATING MECHANISM FOR CHANGE OF TOOL

BACKGROUND OF THE INVENTION

1. Field of the Invention

The present invention relates to a main shaft locating mechanism for change of tool, and more particularly to a locating mechanism wherein an eccentric locating pin is axially fitted with an eccentrical hole of a locating seat and the main shaft stops rotating before the tool changing mechanism loosens the tool.

2. Description of the Prior Art

It is known that the tool mounted on a main shaft of a machining device must be frequently changed according to the shape and material of the work piece or due to abrasion or damange of the tool. For facilitating the change of the tool, the machining device is often provided with an automatic tool changing mechanism. At the time of changing the tool, the position of the handle of the tool is often needed to be identified. Therefore, it is necessary to locate the main shaft before changing the tool. The conventional main shaft locating mechanisms can be divided into electronic type and mechanical type. The former usually includes several sensing elements for detecting the position of the main shaft and a driver for locating the main shaft at a desired position. The cost for such electronic locating mechansim is often considerably high. On the other hand, the mechanical locating mechanism usually includes a hydraulic cylinder, a piston, a piston stem and cooperative closely spaced switches. Such locating mechanism is mostly disposed on a lateral side of the main shaft to radially displace for locating the main shaft. This increases the dimension of the main shaft and causes inconvenience with respect to a main shaft contained in a housing with limited dimension (such as an internally hidden main shaft of a motor). Moreover, the locating operation is achieved by direct contact so that the abrasion of the main shaft will be relatively great. Although the locating operation can be achieved alternatively by rollers, a problem of undesired clearance will take place.

SUMMARY OF THE INVENTION

It is therefore a primary object of the present invention to provide an improved main shaft locating mechanism in which an eccentric locating pin and is axially fitted with an eccentric hole of a locating seat for stopping the main shaft from rotating.

It is a further object of the present invention to provide the above locating mechanism in which a high pressure gas is injected from the orifices of the eccentric locating pin to create a gas pad effect between the eccentric locating pin and the rotating locating seat so as to greatly reduce the friction between therebetween. In addition, the direction of the high pressure gas can be changed to blow toward the interior of the mandrel to clear up the chips accumulated therein.

The present invention can be best understood through the following description and accompanying drawing, wherein:

DETAILED DESCRIPTION OF THE PREFERRED EMBODIMENT

Figure 1:
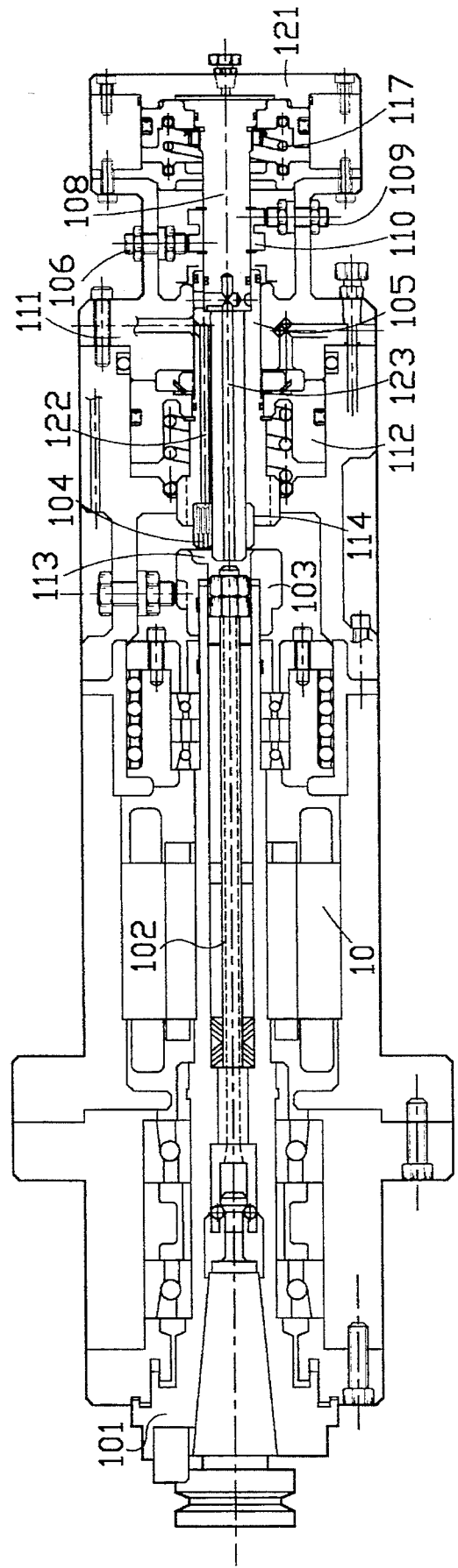
FIG. 1 is a sectional view showing the main shaft locating mechanism of the present invention.
Figure 2:
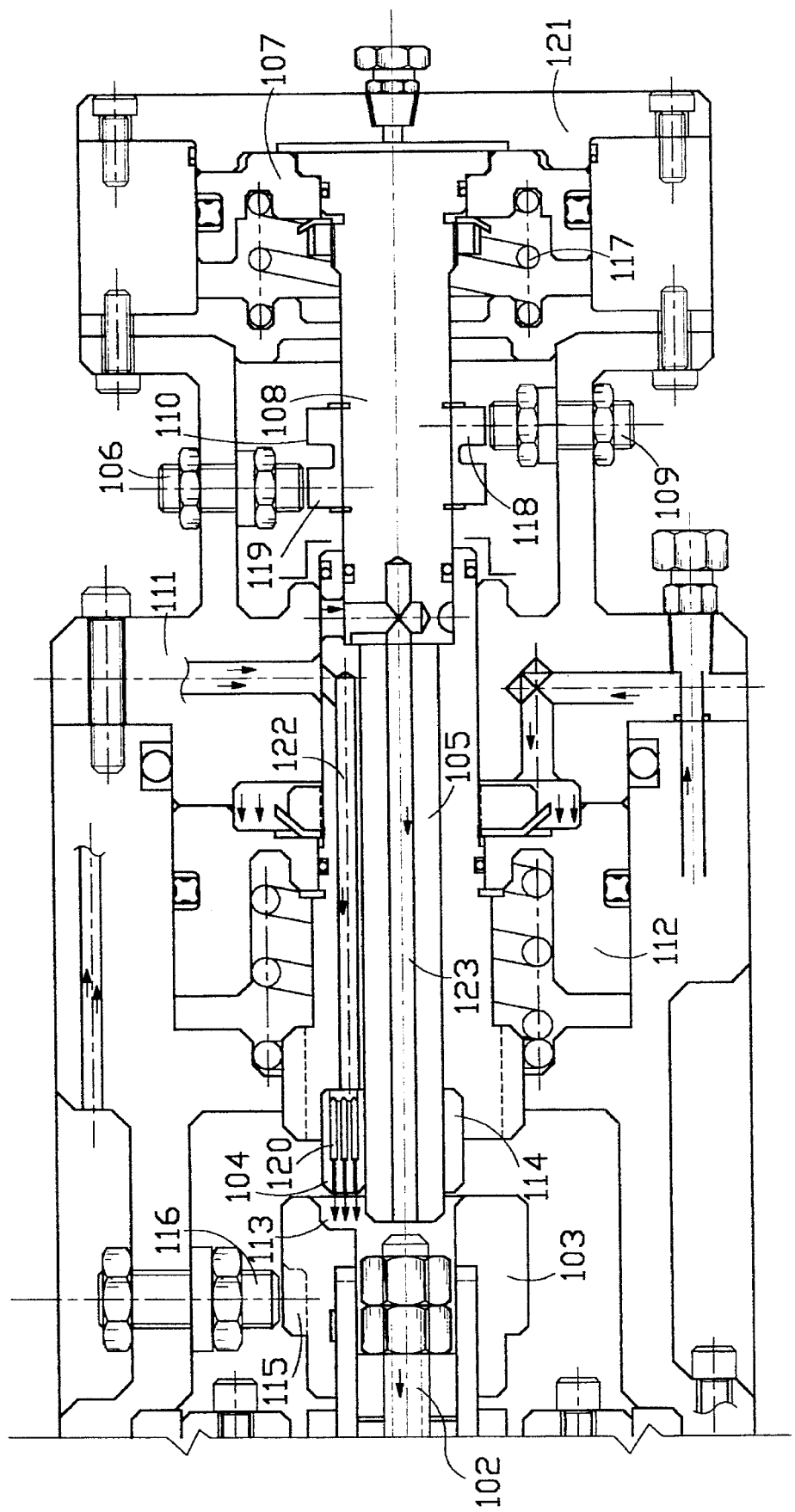
FIG. 2 is an enlarged view of the primary portion of the main shaft locating mechanism shown in FIG. 1.

Please refer to FIGS. 1 and 2 which show the main shaft locating mechanism of the present invention, wherein before loosening a tool mounted on an internally hidden main shaft of a motor 10, the motor 10 is powered off and a mandrel 101 continues to rotate due to inertia. A pneumatic piston 112 is driven by a pneumatic source to push forward a splined shaft 105 and an eccentric locating pin 104 fixedly connected therewith. At this time, a pushing rod 108 does not move.

A locating seat 103 moving along with the mandrel 101 is formed with an eccentric hole 113. When locating the main shaft, the pneumatic source generates high pressure gas to flow from a pipe-connecting head seat 111 through a pipe line of the splined shaft 105 to the eccentric locating pin 104 in a direction shown by arrows of FIG. 2. The high pressure gas is then injected out from several orifices 120 of a disk 114 on which the eccentric locating pin 104 is mounted. The high pressure gas creates a gas pad effect between the eccentric locating pin 104 and the locating seat 103 to reduce the friction therebetween. Therefore, the eccentric locating pin 104 is pushed by the pneumatic piston 112 to slowly fit with the eccentric hole 113 of the locating seat 103. This means that when the locating seat 103 must be rotated through a certain angle to make the eccentric locating pin 104 fitted with the eccentric hole 113 of the locating seat 103. Once the same are fitted with each other, the mandrel 101 immediately stops rotating.

Figure 3:
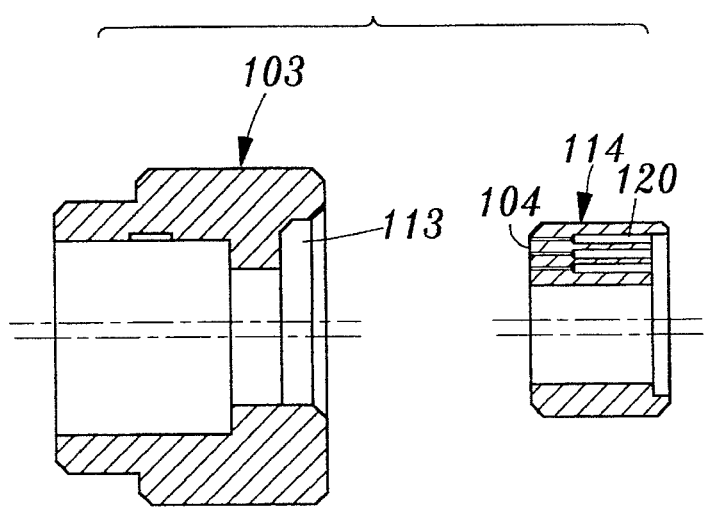
FIG. 3 is an enlarged axially sectional view of a first embodiment of the locating mechanism composed of the eccentric locating pin and locating seat.
Figure 4:
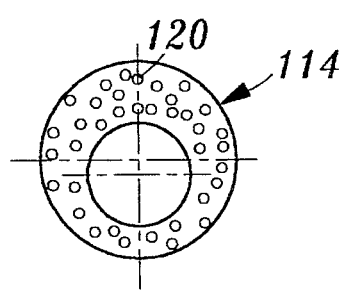
FIG. 4 is a side view of the eccentric locating pin of FIG. 3.
Figure 5:
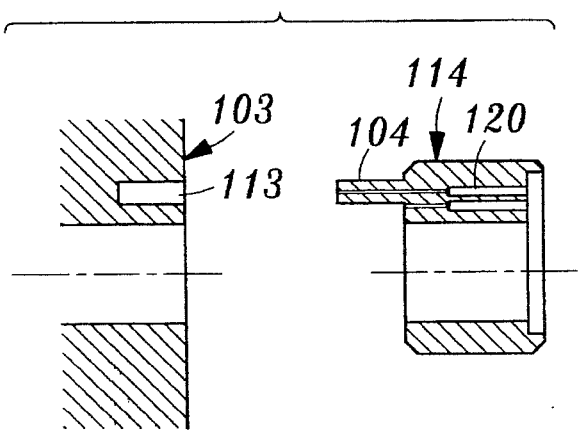
FIG. 5 is an enlarged axially sectional view of a second embodiment of the locating mechanism.
Figure 6:
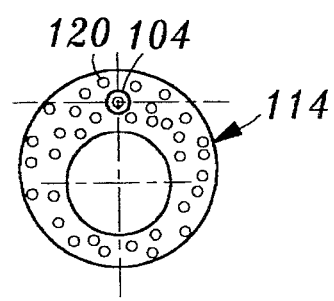
FIG. 6 is a side view of the eccentric locating pin of FIG. 5.
Figure 7:
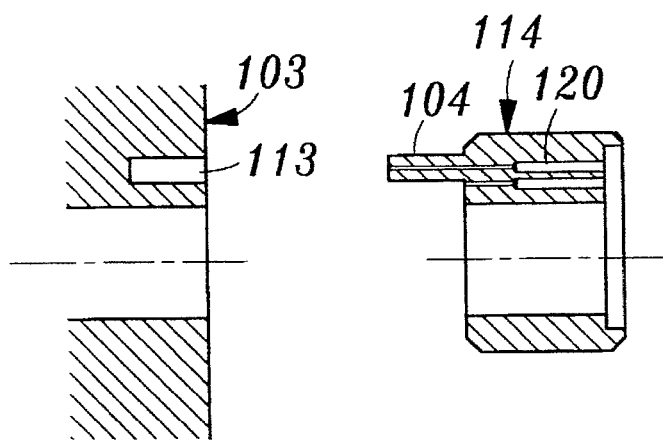
FIG. 7 is an enlarged axially sectional view of a third embodiment of the locating mechanism.
Figure 8:
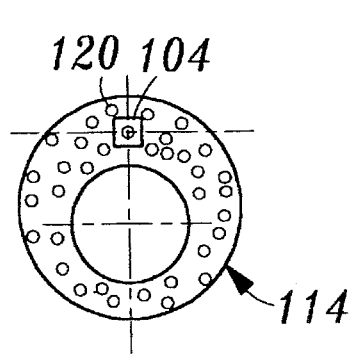
FIG. 8 is a side view of the eccentric locating pin of FIG. 7.
Figure 9:
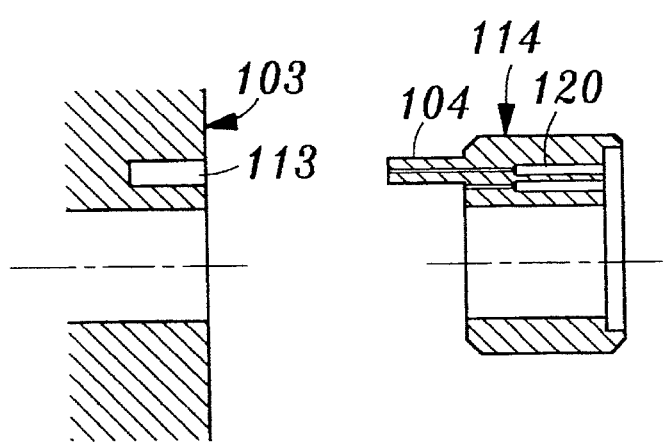
FIG. 9 is an enlarged axially sectional view of a fourth embodiment of the locating mechanism.
Figure 10:
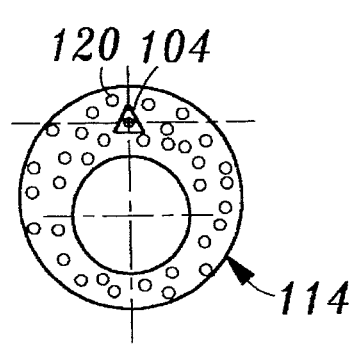
FIG. 10 is a side view of the eccentric locating pin of FIG. 9.

Please refer to FIGS. 3 to 10 which show several embodiments of the locating mechanism, wherein the eccentric locating pin 104 can be disposed on the disk 114 (or an eccentric disk 114 can be disposed instead as shown in FIG. 3). In addition, the eccentric locating pin 104 and the disk 114 are formed with several irregularly arranged orifices 120 for communicating the pipe lines 122 inside the eccentric locating pin 104 and the splined shaft 105 so that the high pressure gas can pass therethrough. The locating seat 103 is formed with an eccentric hole 113 corresponding to the eccentric locating pin 104. For example, the cross-section of the eccentric locating pin 104 can be circular as shown in FIG. 6 or triangular as shown in FIG. 8 or square as shown in FIG. 10. Correspondingly, the cross-section of the eccentric hole 113 can be circular, triangular or square so that the eccentric locating pin 104 can be axially snugly fitted into the eccentric hole 113 of the locating seat 103.

When the eccentric locating pin 104 is fitted into the eccentric hole 113 of the locating seat 103, the mandrel 101 stops rotating and a sensing key 115 of the locating seat 103 is aligned with a closely spaced switch 116 which emits a signal, making the hydraulic source drive the hydraulic piston 107 to push the push rod 108. The push rod 108 further pushes an abutting rod 102 to perform the tool-loosening operation. The push rod 108 is disposed at a central portion of a head seat 121 and the pipe-connecting head seat 111. When the hydraulic piston 107 is released from the pressure and moves back, the push rod 108 is restored to its home position by a spring 117. After the main shaft is located, the high pressure gas will pass from the pipe-connecting head seat 111 through the pipe lines 123 inside the splined shaft 105 and push rod 108 to the abutting rod 102 and blow out therefrom so as to prevent the cutting chips from entering the mandrel 101.

Another set of closely spaced switches 106, 109 and a separating ring 110 serve to control the pushing distance of the push rod 108. The separating ring 110 is disposed on the push rod 108 and has ring posts 118, 119 respectively aligned with the closely spaced switches 106, 109, whereby the pushing distance of the push rod 108 can be controlled by the closely spaced switches 106, 109.

In conclusion, the features and advantages of the present invention are as follows:

1. The main shaft is located by means of axially fitting the eccentric locating pin into the eccentric hole of the locating seat.

2. The high pressure gas in injected from the orifices of the eccentric locating pin and disk to create a gas pad effect between the eccentric locating pin and the locating seat so as to reduce the friction or collision therebetween.

3. The same pneumatic source is used to supply high pressure gas for creating gas pad effect before locating operation and for blowing out from the abutting rod after locating operation.

4. The push rod is restricted from moving outward before the locating operation.

It is to be understood that the above description and drawings are only used for illustrating the embodiments of the present invention, not intended to limit the scope thereof. Any variation and derivation from the above description and drawings should be included in the scope of the present invention.

What is claimed is:

1. A main shaft locating mechanism for change of tool, said locating mechanism being adapted to be applied to an internally hidden main shaft of a motor, comprising:

a mandrel in which an abutting rod is disposed;

a head seat disposed coaxially with said mandrel;

a pipe-connecting head seat disposed between said mandrel and said head seat and coaxially therewith;

a locating seat disposed at one end of said abutting rod and disposed with an eccentric hole and a sensing key;

a push rod disposed at a middle portion of said head seat and said pipe-connecting head seat;

a splined shaft connected with said push rod and disposed with a disk opposite to said abutting rod, said disk being disposed with an eccentric locating pin corresponding to said eccentric hole of said locating seat and adapted to axially fit thereinto;

a separating ring disposed on said push rod for loosening the tool, said separating ring being connected with several closely spaced switches for controlling the moving travel of said push rod;

a hydraulic piston for pushing said push rod; and a pneumatic piston for pushing said splined shaft, wherein said eccentric locating pin is adapted to axially fit into said eccentric hole of said locating seat at a certain angle, and said disk and said eccentric locating pin are formed with several orifices for guiding high pressure gas to blow therefrom toward said locating seat, forming a gas pad to reduce friction between said eccentric locating pin and said locating seat, said splined shaft being adapted to be pushed by said pneumatic piston to drive said disk and locating pin to move toward said locating seat and fit therewith when said high pressure gas blows from said orifices of said disk and locating pin, said push rod being driven by said hydraulic piston, whereby after said disk and said locating pin are fitted with said locating seat to make said mandrel stop, said push rod pushes said abutting rod to loosen the tool and the direction of said high pressure gas is changed to blow through a pipe line toward said mandrel so as to clear up cutting chips accumulated therein.

2. A locating mechanism as claimed in claim 1, wherein the cross-section of said eccentric hole of said locating seat is circular, triangular or square.

3. A locating mechanism as claimed in claim 1, wherein the cross-section of said eccentric locating pin is circular, triangular or square.

4. A locating mechanism as claimed in claim 1, wherein both said eccentric locating pin and disk are formed with several orifices for conducting the high pressure gas to a clearance in front of said locating seat for reducing abrasion or collision.

5. A locating mechanism as claimed in claim 1, wherein said high pressure gas is conducted through a pipe line to said eccentric locating pin and said locating seat to form a gas pad therebetween before said mandrel is stopped and located and said high pressure gas is changed in direction to be conducted into said mandrel so as to blow away cutting chips therein.

\* \* \* \* \*